United States Patent

Goodridge

[15] 3,698,847
[45] Oct. 17, 1972

[54] APPARATUS FOR PRODUCING HOLLOW ARTICLES

[72] Inventor: Walter R. Goodridge, Fairfield, Conn.

[73] Assignee: Electrostatic Equipment Corporation, Stratford, Conn.

[22] Filed: May 12, 1971

[21] Appl. No.: 142,460

Related U.S. Application Data

[62] Division of Ser. No. 814,121, April 7, 1969.

[52] U.S. Cl. .................................................. 425/174
[51] Int. Cl. ............................................... B29h 5/24
[58] Field of Search ...... 18/DIG. 20, DIG. 50, 24, 41; 425/174 R

[56] References Cited

UNITED STATES PATENTS

| | | |
|---|---|---|
| 1,855,809 | 4/1932 | Sheppard et al. ........ 18/41 UX |
| 2,461,270 | 2/1949 | Habib et al. .................. 18/41 |
| 3,234,596 | 2/1966 | Sims ..................... 18/DIG. 20 |
| 2,325,073 | 7/1943 | Reach ....................... 18/45 R |
| 3,610,563 | 10/1971 | Allen ........................ 18/45 R |

Primary Examiner—H. A. Kilby, Jr.
Attorney—Peter L. Costas

[57] ABSTRACT

A generally hollow article is produced by coating a collapsible, seamless bladder with integrable particles, integrating the particles into a unitary structure, and thereafter removing the bladder therefrom. The apparatus includes coating means to form a fluidizing mass the particles, means for acting upon the bladder to promote adhesion, and means for integrating the particles on the bladder into a hollow article. The bladder is normally non-adherent to the particles, and is comprised of at least one material that is responsive to the adhesion promoting means.

8 Claims, 3 Drawing Figures

PATENTED OCT 17 1972

INVENTOR.
WALTER R. GOODRIDGE

BY Peter L. Costas
ATTORNEY

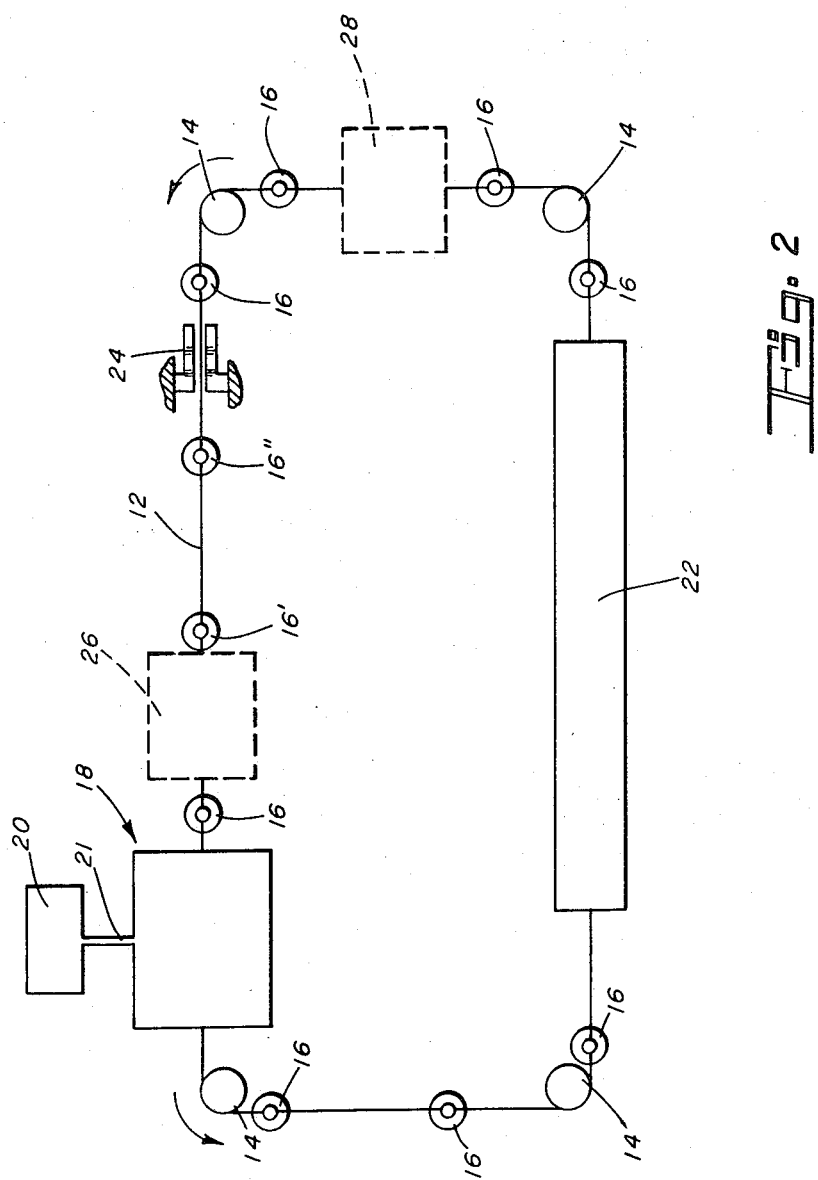

APPARATUS FOR PRODUCING HOLLOW ARTICLES

RELATED APPLICATION

This application is a divisional of copending application for United States Letters Patent, Ser. No. 814,121 filed Apr. 7, 1969.

BACKGROUND OF THE INVENTION

Although numerous techniques have been devised for producing, from a wide variety of materials, articles that are hollow and/or intricate in design, the known methods are generally subject to one or more disadvantages and most often are not entirely satisfactory. Among those disadvantages are the expense and the complicated nature of the equipment which must be used and the complexity that the method itself commonly entails. As a result, such articles are currently produced by means that tend to be disproportionate in expense and/or in effort to the value of the finished product.

One common manufacturing technique involves the production of the article in a plurality of sections for subsequent assembly, since the individual sections can be produced using relatively inexpensive equipment which may be quite simple in design. However, the articles so produced necessarily have seams, which are usually undesirable both aesthetically and, more significantly, from the standpoint of the potential leakage which can occur therethrough if the sections are imperfectly assembled (e.g., when bottles are produced by such a method). In addition, forming an article in sections necessarily involves more steps than are required if the article is integrally formed, and this is of course also less desirable.

In addition to the foregoing factors, certain materials which possess valuable properties are not feasible for the production of molded articles because they are not well suited for processing by conventional apparatus. For example, a number of known resins exhibit undesirably high viscosities at practical molding temperatures and/or are subject to relatively high levels of degradation under the conditions of molding.

Accordingly, it is an object of the present invention to provide novel apparatus for producing generally hollow articles in a manner that is rapid, facile and relatively inexpensive.

It is also an object of the invention to provide apparatus enabling the production of articles or relatively complex configuration, controlled wall thicknesses, and without seams, in a limited number of operations.

Another object is to provide apparatus enabling the production of such articles with inexpensive materials of a type that may be difficult or infeasible to fabricate utilizing conventional equipment and techniques.

A further object is to provide apparatus enabling molecular orientation of generally hollow articles made of orientable resins, in a facile and convenient manner.

A still further object is to provide such apparatus which is simple in design and relatively inexpensive.

SUMMARY OF THE INVENTION

It has now been found that the foregoing and related objects of the invention may be readily attained in apparatus comprising coating means for forming a fluidized mass of integrable particles, and a collapsible, substantially seamless bladder form for the article. The bladder is relatively non-adherent to the particles and is comprised of at least one material that is responsive to means acting thereon to promote adhesion of particles coming into contact therewith. The apparatus also includes means for acting upon the bladder form to promote particle adhesion thereto, and means for integrating the particles on the bladder form into a cohesive, unitary, generally hollow article disengagable from the bladder.

In the preferred embodiments, the adhesion promoting means includes heating means and the responsive material provides to the bladder a heat capacity sufficient to maintain the bladder at a relatively high temperature. For example, the bladder may desirably be fabricated of a silicone rubber. When the adhesion promoting means includes heating means, it is beneficial for the apparatus to have mounting means for the bladder, comprising a heat-sink partially inserted thereinto to conduct heat from the adjacent bladder portion and reduce the adhesion of particles thereat. In accordance with certain objects, the bladder is inflatable and the apparatus additionally includes a pressure source connected to the bladder to effect the inflation thereof.

Most desirably, the coating means employed in the apparatus includes a D.C. voltage source for forming, as the fluidized mass, a cloud of electrically charged integrable particles. In such apparatus, the particle adhesion promoting means also induces attraction between the particles and the bladder, and includes means engagable with the bladder for maintaining it at such an electrical potential as to charge the bladder effectively opposite to the particles, to induce such attraction. The means to promote adherence to the bladder may also be the D.C. voltage source, in which case one pole of the voltage source is effectively attached to the bladder to charge it to a potential opposite to that of the particles. The bladder so employed must be comprised at least partially of a material that is at least electrically semi-conductive to provide the adherence promoting responsive material. Such responsive material may advantageously be finely divided, and may be provided by electrically conductive metals, graphite, and the like. In many instances, integration of the particles adhered to the bladder will most beneficially be effected using heating means.

BRIEF DESCRIPTION OF THE DRAWING

FIG. 2 is a schematic diagram of one embodiment of such apparatus; and

DETAILED DESCRIPTION OF THE ILLUSTRATED EMBODIMENTS

Figure 1:
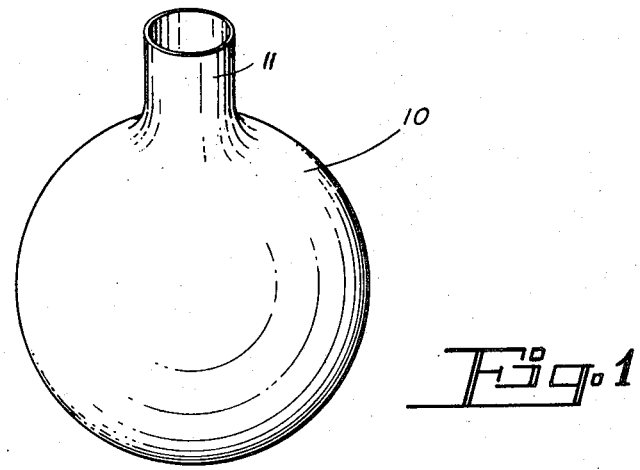
FIG. 1 is a perspective view of a Christmas tree ornament produced with the apparatus of the invention.

Turning now in detail to the appended drawings, FIG. 1 illustrates a hollow Christmas tree ornament 10, which may be produced in accordance with the present invention and which has an open neck 11. One form of apparatus suited for the production of articles such as ornament 10 is schematically illustrated in FIG. 2, and includes a chain or line conveyor 12 which is mounted to move continuously about four suitable sprockets or pulleys 14, defining a generally rectangular path therefor in the direction indicated by the arrows. Positioned on the conveyor 12 are a multiplicity of forms 16 which are each adapted to produce the Christmas tree ornament 10 of FIG. 1. The form 16' is positioned ahead of the first stage of the apparatus and the form 16'' is at the last stage thereof, although it will be appreciated that the apparatus illustrated operates continuously.

Initially, form 16' enters a coating station, generally designated by the numeral 18, which has an associated supply hopper 20 containing the coating material; a conduit 21 extends therebetween to transport the material from the hopper 20 into the station 18. The coated form 16' progresses from the coating station 18 in which the coating material is deposited thereon and adhered thereto, into the oven 22, wherein it is subjected to elevated temperatures to integrate or fuse the particles, it being assumed for the purpose of description that the particles are of a heat-fusible material. After exiting from the oven 22, the integrated coating is allowed to harden on the form and become unified into a cohesive structure, after which the form passes through the prongs of an inclined bifurcated device 24 to separate the article therefrom.

In optional embodiments (illustrated by dotted line representation), the apparatus includes a preheating oven 26 positioned upstream of the coating station 18 and a cooling chamber 28 positioned downstream of the oven 22. The preheating oven 26 is suitable when it is desirable to preheat the forms 16 to cause adherence of a heat-fusible powder thereto, and the forms must have sufficient heat capacity to maintain a temperature high enough for fusion after preheating. Although it is usually possible to cool the formed article satisfactorily under ambient conditions after they exit from the oven 22, use of the cooling chamber 28 enhances the efficiency of cooling and decreases the time required.

Figure 3:
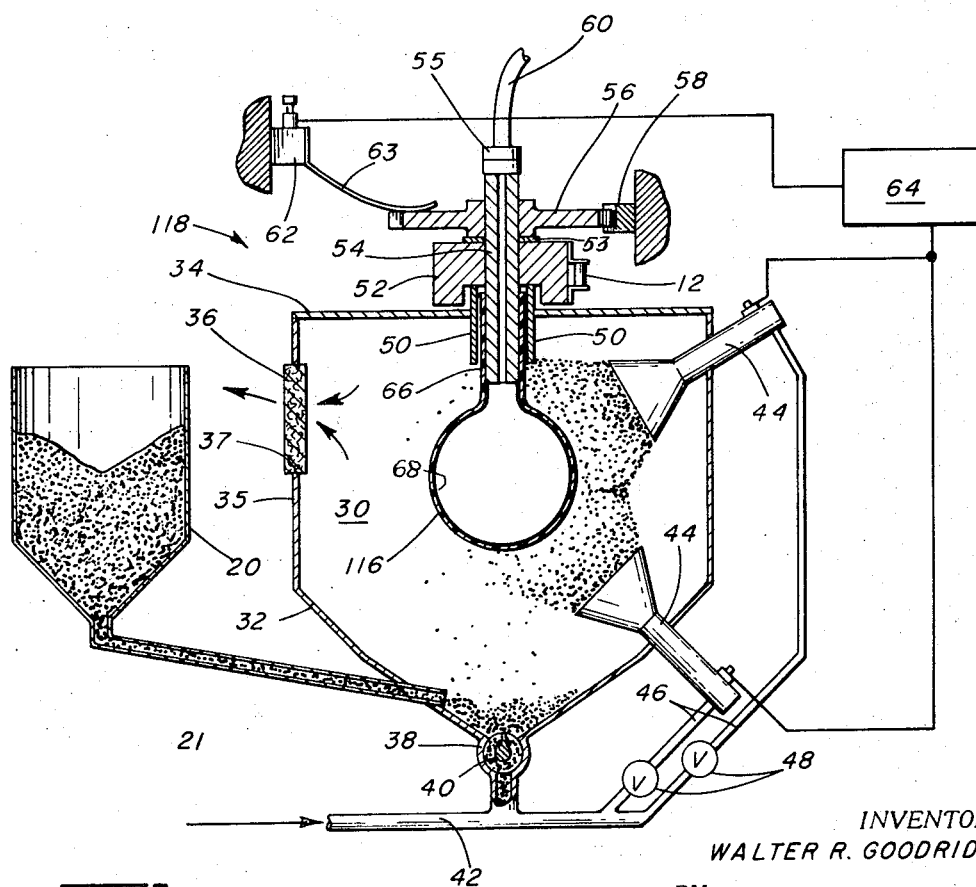
FIG. 3 is a partially diagramatic representation of electrostatic coating means suitable for use to produce articles of the type illustrated in FIG. 1, and of a bladder form having appropriate characteristics therefor.

Referring now specifically to FIG. 3, electrostatic coating means generally designated by the numeral 118 provides the coating station 18 of the apparatus described generally in FIG. 2. The coating means 118 includes an enclosed chamber 30 having a generally V-shaped bottom section 32 and a slotted top 34. The sidewall 35 above the bottom section 32 has an aperture 37 therein to relieve pressure in the chamber 30, and a filter element 36 is mounted in the aperture 37. Beneath the V-shaped section 32 is an elongated collection chamber 38 which is circular in cross section, and a screw conveyor 40 is rotably seated in the chamber 38. Although it may not be apparent from the Figure, it should be appreciated that the collection chamber 38 extends along the length of the enclosed chamber 30 and that the screw 40 is utilized to convey powder which falls to the bottom of the enclosed chamber 30 along the length thereof and into the air chamber 42, which is mounted beneath the collection chamber 38.

The enclosed chamber 30 has two powder guns 44 mounted in the bottom section 32 and the sidewall 35 and directed inwardly toward the form 116 conveyed therethrough. An air hose 46 is connected to each of the guns 44 and communicates through a respective valve 48 with the air chamber 42. Air introduced into the air chamber 42 carries powder through the valves 48 (when they are open), into the guns 44 and toward the form 116.

Centrally located in the slotted top 34 of the enclosed chamber 30 is a pair of tracks or rails 50 which define an elongated slot therein, and bushing block 52 is suitably designed to ride upon the upper ends of the tracks 50 and is rigidly attached to the conveyor 12 so that it can be conveyed thereby along the top of the coating station 118. The tracks 50 not only support the bushing block 52 and define a path through the booth 18, but they also extend downwardly along the neck 66 of the form 116 so as to mask a portion thereof and prevent powder from depositing thereupon. The masking effect creates an aperture in the article through which the flexible mold or form 116 can ultimately be removed, which in the bulb 10 illustrated in FIG. 1 is the end of the neck 11 thereof.

Rotably supported and extending through the bushing block 52 is a hollow support tube 54, which projects along the depth of the tracks 50 and serves to support the neck 66 of the form 116 by insertion of the lower end thereinto. A pinion 56 is secured adjacent the upper end of the support tube 54, with a thin washer 53 therebetween, and the pinion 56 cooperates with the stationary rack 58; engagement of the teeth of the pinion 56 with the rack 58 results in rotation of the pinion 56, support tube 54 and form 116 so that a uniform coating is produced on all exposed surfaces of the latter.

A hose 60 connected to a pressure source (not shown) is secured to the end of the support tube 54 by conventional coupling means 55 so that the form 116 may be inflated or deflated as desired. A suitable electrical contact assembly 62 has a finger 63 bearing against and making wiping contact with the upper surface of the pinion 56. The source 64 of high voltage potential, which is diagramatically illustrated, has one pole connected to the powder guns 44 and the other pole connected to the electrical contact assembly 62 so that powder passing through the guns 44 is charged to a polarity opposite to that to which the form 116 is charged, insulation being provided where necessary to avoid short circuiting (the body of the guns 44 illustrated are non-conductive for that purpose). A layer of conductive material 68 on the inside surface of the form 116 renders it electrically conductive.

As should now be evident, the illustrated electrostatic station 118 operates with the form 116 passing along the length of the slot in the top 34 of the enclosed chamber 30; while doing so, it rotates and is exposed to powder which is projected thereagainst under air pressure from the powder guns 44. By virtue of the opposite charges on the powder and the form 116, resulting from connection to the high voltage source 64, the powder is electrostatically attracted to and adhered on the surface of the form 116. Thereafter, the form 116 passes to a location at which the particles are integrated such as the oven 22 illustrated in FIG. 2.

It should be appreciated that although an electrostatic coating chamber has been illustrated and constitutes a perferred embodiment of the invention, other forms of coating means wherein a fluidized mass of material is formed may be used in lieu thereof. For example, the coating station 18 illustrated in FIG. 2 may represent a conventional or electrostatic fluidized bed into or proximate to which the form 16 may be passed. The essential feature of the invention in this regard is that the means provide a fluidized mass of material, and the particular type of equipment utilized to do so is not critical.

Moreover, although only a single coating station is depicted in FIG. 2, in some instances it may be desirable to utilize a plurality of coating stations located sequentially along a travel path for the form. Such an arrangement could be used to advantage to produce articles having interior and exterior walls with different properties (e.g., for packaging applications), to manufacture articles of increased wall thickness, or for making articles which have printing and/or decorative effects by preferential masking.

The nature of the particulate, normally solid material utilized to coat the form may vary greatly, and will dictate the type of equipment which is suitable for use at the coating, integration, and other stages of the apparatus. Of the numerous types of materials which are suitable, thermoplastics, and particularly synthetic thermoplastic resins, are preferred, exemplary of which are the vinylidenes and vinyls (e.g., polystyrene and polyvinyl chloride), the olefins (e.g., polyethylene, polypropylene and copolymers thereof), the cellulosics, polyamides (e.g., nylons), etc. Since the processability and flow characteristics of the material are much less significant in the present process than in conventional molding techniques, and since long exposure to high temperatures can be avoided, this process is ideally suited for the manufacture of articles from materials having relatively poor processing characteristics and heat stability. Moreover, by use of the present apparatus, articles can readily be made of a combination of materials and, if the different materials are applied sequentially, only one layer need be of any integrable material.

The material utilized for the bladder which serves as the form will depend to a large measure upon the type of material that is to be coated thereon and may vary considerably, as long as the material provides a bladder that is collapsible and substantially seamless, normally relatively nonadherent to the particles, and responsive to appropriate adhesion promoting means. If the bladder is to be subjected to heat, either in a preheating step or in a subsequent step of fusion, the material used for the bladder must not be adversely affected by the elevated temperatures to which it is exposed. As has been pointed out, if the heating step is to promote adhesion, the heat capacity of the bladder material must be appropriately high for adequate temperature effect, although cooling devices may then also be necessary for practical operation. Similarly, if the coating is to be applied by an electrostatic technique, provision is desirably made so that the electrical potential of the bladder can be controlled. Although it may be most convenient to utilize a material for the bladder which has inherent electrical conductivity when an electrostatic technique is to be employed, more conventional rubbers may be modified to provide the necessary level of conductivity. For example, such materials may be filled with metal or graphite, or may have metal or graphite deposited upon the interior surface thereof. In some cases, it will be desirable to reinforce the bladder for enhanced strength, and such reinforcement may be relied upon to provide the electrical conductivity. Other possibilities include the provision of a vacuum-deposited "metallized" surface on the exterior of the bladder which can be utilized for conductivity and which might also be transferable under heat to the interior of the article formed; in this manner, a metallized effect can be produced on the article if it is fabricated of a transparent material. Finally, it may be advantageous to circulate a liquid through the bladder for the purpose of heating, cooling, or inflation thereof, and such a liquid may be utilized to provide a conductive medium. If the bladder is to be inflated, it should be produced of a material which possesses sufficient elasticity or resiliency to allow it to assume its original size and shape even after repeated cycles of inflation and deflation.

The bladder will, of course, be properly configured for the particular article to be produced, of which ornaments and bottles are merely exemplary; the method and apparatus disclosed may be employed to produce a myriad of different articles. Moreover, although the invention may be most beneficially applied to the manufacture of articles which are nearly closed, the term "-generally hollow articles" is intended to encompass relatively open articles from which removal of the form is considerably less difficult, but in which the collapsability feature is of benefit.

The method by which the bladder is produced is relatively insignificant to the invention and should not be construed to impose any limitations whatsoever thereupon; for example, it may be convenient to form the bladder in a destructible mold such as one made of wax, glass or other frangible material, or one constructed of a soluble substance for subsequent separation of the bladder and mold. A hollow mold may be used to cast or mold the bladder with the advantage that the mold need not be destroyed and can be utilized repeatedly.

With further reference to the apparatus, any suitable type of conveyor may be utilized in place of the chain conveyor, which is diagrammatically illustrated, to convey the forms between operating stations for continuous production. Furthermore, such a conveyor can be dispensed with entirely and other means substituted therefor, or the molds may be transported manually between sequential stations. The heating means may be quite conventional and may be provided by convection, infrared or induction ovens, or, as has been suggested previously, it may be a heated liquid (e.g. an oil) which is passed through the bladder. Conventional cooling means may also be used, and may involve the use of air or other fluid at a relatively low temperature or a conventional refrigerant liquid. Such fluids may be used either externally or internally of the bladder, and the effect thereof may be either direct or indirect.

As has also been mentioned with respect to the description of the drawings, provision will normally be made, such as by masking a portion of the bladder, for creating an aperture in the article produced, although the aperture can be formed in a subsequent operation.

The means for masking the bladder may be physical, i.e., utilizing a structural barrier as a shield such as the tracks illustrated, or a masking effect may be achieved by using appropriately directed air jets, by brushing or by electrical repulsion when an electrostatic technique is involved. As an additional possibility, when the coating material is caused to adhere to the bladder by fusion thereof during a preliminary stage, or when it is subsequently heated, a heat-sink may be provided at the portion of the bladder on which the coating is not desired so that adherence does not occur or so that adhering material is readily removable. The heat-sink can be the member supporting the bladder, such as the support tube shown in FIG. 3, and it can be cooled internally, such as by water, air, or the like.

Although the term "fusion" as used herein will most generally relate to the effect induced at elevated temperatures as is consistant with its most literal meaning, a somewhat broader interpretation is intended to be applied to its use in describing the present invention. Thus, for example, treatment with solvent vapors and electron irradiation can be used to induce flow in certain materials, and in instances in which materials of those type are employed the term "fusion" is intended to encompass such techniques. Moreover, ultrasonic vibrations may be utilized to produce fusion of certain types of particles. As will be apparent, in such cases suitable equipment will be used instead of the oven depicted in the drawing; it will also be apparent that such techniques will permit other materials to be employed for the bladder, for example materials which are not well-suited to use at elevated temperatures.

As regards the electrical circuitry employed for electrostatic coating, it will normally be quite conventional and modified only as may be necessitated by the particular application. It should be appreciated that the bladder need not be connected directly to the source of high voltage as is shown in the drawing; it may be grounded either independently or through other portions of the apparatus, which are desirably maintained at ground potential in accordance with recommended safe operating procedures.

It is a particularly advantageous feature of the invention that the apparatus employed may be used very conveniently to enhance the properties of the article produced. Thus, it is well known that the properties of certain resins, such as polypropylene, are improved by orientation of the molecules thereof along one or more axes, and the conditions for accomplishing such orientation are quite well known to those skilled in the art. In accordance with one embodiment of the present invention wherein the bladder is fabricated of an inflatable material, after the coating thereon has been brought to a suitable temperature, the molecules of the material can be multi-axially oriented simply by inflating the bladder to increase its dimensions and thus stretch the article thereon. The remaining steps of the method need not be modified in any way to achieve this desirable result.

Following production of the article, it need only be stripped from the bladder; such stripping is facilitated, as has been mentioned previously, by creating an aperture in the article during coating by appropriate masking. If the opening is at least about one-fourth the size of the largest cross-sectional dimension of the bladder, and if the bladder is reasonably flexible, it can normally be pulled directly from the article. In addition, the normal nonadherence of the bladder material to the particle also significantly facilitates separation. However, if characteristics of the article or the bladder render separation more difficult, air jets or the like can be employed to collapse, vibrate and lubricate the bladder to facilitate its removal, or a lubricating material can be injected between the bladder and the article for the same purpose. Additional possibilities to facilitate separation include rotation of the bladder relative to the article and the use of a vacuum which should be applied gradually so as not to rip the bladder. In some instances, the other advantages of the invention may render it of sufficient value so that destruction of the bladder to effect its removal will not be a significant disadvantage; however, it will usually be more desirable to preserve the bladder for repeated use. The means used to actually extract the bladder from the article may vary widely, the inclined fork or bifurcated member illustrated in the drawing merely being exemplary.

Illustrative of the efficacy of the present invention is the following specific example.

EXAMPLE ONE

A conventional 2½ inch round Christmas tree ornament was utilized as a destructible model. A plastic tube was fitted over the neck of the ornament, and it was then coated with nylon powder in an electrostatic fluidized bed. When a coating of about one-thirty-second to one-sixteenth inch was built up (in several sequential coating and fusing operations), the interior glass ball was broken by flexing the nylon shell and the fragments thereof removed; the shell was utilized as a mold in subsequent operations.

After coating the inside of the nylon mold with a release agent, a liquid silicone polymer was poured into it; the mold was rotated to ensure complete coverage and then inverted and drained. Thereafter, the mold was heated for 15 to 30 minutes at 100° Centigrade to cure the polymer, cooled, and the bladder so produced was removed by blowing air between it and the mold. The wall thickness of the finished bladder was about 0.005 to 0.01 inch.

Powdered graphite was then poured into the bladder and rubbed on the inside wall thereof to provide an electrically conductive surface. The bladder was thereafter adhesively secured on a heavy-walled tube inserted into the neck thereof just far enough so that one end coincided with the point where the ornament's neck was to terminate. The tube functioned as a heat-sink so that, after a subsequent fusing step, the powder on the bladder adjacent the tube end could be removed easily.

The tube in the neck of the bladder was electrically grounded, and the bladder and tube were then axially rotated in a grounded electrostatic fluidized bed for a period of about 5 to 10 seconds. The powder used for coating was a clear polyvinyl chloride resin, although other vinylidene and olefin polymers have also been used successfully. After removing the coated bladder from the fluidized bed, it was rotated in a convection oven at about 450° Fahrenheit for a period of about 3 minutes to fuse and integrate the particles into a unified article. The bladder with the article on it was then cooled under ambient conditions for about 2 minutes and compressed air was directed at the terminus of the neck of the ornament. Partially fused powder was thereby removed and the bladder was collapsed somewhat under the air force. Upon removal of the bladder through the neck of the article there was obtained a Christmas tree ornament of substantially the same dimensions as the original ornament utilized as a mold.

Thus, it can be seen the present invention provides novel apparatus for producing generally hollow articles in a manner that is rapid, facile and relatively inexpensive. It permits the production of articles or relatively complex configuration in a limited number of operations, and the articles are formed without seams and with walls of controlled thickness. Materials which are relatively inexpensive and/or difficult to fabricate utilizing conventional molding apparatus may be employed in accordance with the present invention, and orientation of the molecules in the article produced may readily be accomplished to improve the properties thereof. The apparatus is simple in design and relatively inexpensive.

Having thus described the invention, I claim:

1. In an apparatus for producing a generally hollow article, the combination comprising coating means including a D.C. voltage source and a gas source for forming a cloud of electrically charged integrable particles; a flexible bladder form for the article, said bladder form being relatively non-adherent to said particles and being comprised of at least one material that is responsive to means acting thereon to promote adhesion of charged particles coming into contact therewith; means for acting upon said bladder form to promote particle adhesion thereto and to induce attraction therebetween, comprising at least means engageable with said bladder form for maintaining it at such an electrical potential as to charge said bladder form effectively opposite to the particles to induce such attraction therebetween; and means for integrating the particles on said bladder form into a cohesive, unitary, generally hollow article disengageable from said bladder form.

2. The apparatus of claim 1 wherein said adhesion promoting means includes heating means, and wherein said responsive material provides to said bladder form q heat capacity sufficient to maintain said bladder form at a relatively high temperature.

3. The apparatus of claim 2 wherein said bladder form is fabricated of a silicone rubber.

4. The apparatus of claim 2 wherein said apparatus includes means for mounting said bladder form, and wherein said mounting means comprises a heat-sink partially inserted into said bladder form to conduct heat from the adjacent bladder form portion and reduce the adhesion of particles thereat.

5. The apparatus of claim 1 wherein said bladder form is inflatable and wherein said apparatus includes a pressure source, said pressure source being connected to said bladder form for inflation thereof.

6. The apparatus of claim 1 wherein said means to promote adherence to said bladder form is said source of D.C. voltage, one pole of said voltage source being effectively attached to said bladder form to charge said bladder to a potential opposite to that of the particles, said bladder form being comprised at least partially of a material that is at least electrically semi-conductive to provide said adherence promoting responsive material.

7. The apparatus of claim 6 wherein said responsive material is finely divided and is selected from the group consisting of electrically conductive metals and graphite.

8. The apparatus of claim 6 wherein said means for integrating the particles adhered to said bladder includes heating means.

* * * * *